(12) United States Patent
Green (10) Patent No.: US 7,783,888 B2
(45) Date of Patent: Aug. 24, 2010

(54) WATERMARKING IN AN AUDIOVISUAL PRODUCT

(75) Inventor: Stuart Green, Sheffield (GB)

(73) Assignee: Zoo Digital Limited (GB)

( * ) Notice: Subject to any disclaimer, the term of this patent is extended or adjusted under 35 U.S.C. 154(b) by 774 days.

(21) Appl. No.: 11/786,960

(22) Filed: Apr. 13, 2007

(65) Prior Publication Data

US 2007/0283448 A1 Dec. 6, 2007

Related U.S. Application Data

(63) Continuation of application No. PCT/GB2005/003980, filed on Oct. 14, 2005.

(60) Provisional application No. 60/644,267, filed on Jan. 14, 2005.

(30) Foreign Application Priority Data

Oct. 15, 2004 (GB) ................................ 0422961.3

(51) Int. Cl.
*H04L 9/00* (2006.01)
*H04N 7/167* (2006.01)

(52) U.S. Cl. .......................... 713/176; 726/26; 380/201

(58) Field of Classification Search ............. 726/26–33; 713/176; 380/200–204, 241, 54; 705/57–59; 382/100

See application file for complete search history.

(56) References Cited

U.S. PATENT DOCUMENTS 6,683,966 B1 * 1/2004 Tian et al. .................... 382/100
6,700,990 B1 * 3/2004 Rhoads ........................ 382/100

FOREIGN PATENT DOCUMENTS

| EP | 0677842 | 10/1995 |
| EP | 1249835 | 10/2002 |
| EP | 1395060 | 3/2004 |
| WO | 00/56059 | 9/2000 |

OTHER PUBLICATIONS

Bloom, J., et al. "Watermarking to Track Motion Picture Theft", Sarnoff Corporation, Princeton, NJ, 2004, pp. 363-367.
Byers, S., et al. "Analysis of Security Vulnerabilities in the Movie Production and Distribution Process", 2003, pp. 1-18.

* cited by examiner

*Primary Examiner*—Hosuk Song
(74) *Attorney, Agent, or Firm*—Daniel W. Roberts; Law Offices of Daniel W. Roberts, LLC (57) ABSTRACT

An audiovisual product (400) is recorded with a set of watermark characters (421, 701) as video or audio objects. A sequence of the watermark characters (421, 701) is selected and reproduced upon playback to uniquely identify a particular playback instance. Ideally, a user identity code is received upon playback amongst a predetermined set of user identity codes, and the sequence of watermark characters (421, 701) is selected and replayed according to the received user identity code. The sequence of watermark characters (421, 701) allows the user identity code to be traced should the audio and/or visual output of the audiovisual product (400) be recorded such as with a video cassette recorder (VCR).

33 Claims, 10 Drawing Sheets

WATERMARKING IN AN AUDIOVISUAL PRODUCT

This is a continuation of International Patent Application No. PCT/GB2005/003980, entitled "WATERMARKING IN AN AUDIOVISUAL PRODUCT," filed on Oct. 14, 2005, which claims priority to U.S. Provisional Patent Application No. 60/644,267 filed on Jan. 14, 2005 and further claims priority to British Application No. GB 04 22961.3 filed on Oct. 15, 2004. The contents and teachings of these applications are hereby incorporated by reference in their entirety.

The present invention relates in general to a method and apparatus for providing a watermark to deter copying of an audiovisual product, and to an audiovisual product with a watermark as a copy deterrent.

Many situations arise where it is desired to provide a confidential or commercially sensitive audiovisual presentation to a selected audience. As one example, movie studios often release preview versions ("screener discs") of forthcoming movies to an authorised group of users including, for example, studio executives, critics, journalists and award judges. Movies are just one example, and the same situation arises in many other fields.

Since the audiovisual product is being distributed to authorised users, security approaches such as copy prevention or locking the product are often ineffective. In particular, a weakness has been identified in that the authorised user is able to copy the audiovisual product at the point of display or playback of the product. For example, an audiovisual product distributed on an optical disc recording medium can be provided with copy prevention features which make it difficult to directly copy from one optical disc to another. However, when the audiovisual product is replayed to a television screen or monitor, it is then relatively easy to copy the reproduced playback signals such as with a video cassette recorder or personal digital recorder. Whilst the quality of the illegal copy is likely to be much lower than the original product, unfortunately authorised users are occasionally tempted by commercial gain to allow such copying operations.

A problem has been identified in particular when distributing an audiovisual product to a large number of authorised users. For example, it is often necessary to distribute an advance screener version of a movie to several thousand authorised users. Unfortunately, such widespread distribution tends to increase the risk that the screener version of the movie will be copied and then enter unauthorised distribution channels.

A preferred aim of the present invention is to provide an effective mechanism to deter copying of an audiovisual product.

Another preferred aim of the present invention is to provide a watermark as an effective copy deterrent, even when the audiovisual product is distributed to several hundred or several thousand users.

An aspect of the present invention is to address the problems of the prior art, as discussed above or otherwise. Illustrative, non-limiting embodiments of the present invention may overcome the above disadvantages and other disadvantages not described above. The present invention is not necessarily required to overcome any of the disadvantages described above, and the illustrative, non-limiting embodiments of the present invention may not overcome any of the problems described above. The appended claims should be consulted to ascertain the true scope of the invention.

According to the present invention there is provided an apparatus, method and an audiovisual product as set forth in the appended claims. Preferred features of the invention will be apparent from the dependent claims, and the description which follows.

The embodiments of the present invention discussed herein assist in deterring copying of an audiovisual product, and provide an audiovisual product incorporating a copy deterrent. The preferred embodiments of the present invention are particularly effective to deter copying of an audiovisual product while the audiovisual product is being replayed by an authorised user.

In one general aspect of the present invention there is provided a method to deter copying of an audiovisual product.

A first stage in the method relates to recordal of the audiovisual product on a suitable recording medium. User identities are allocated to each of a plurality of users. The audiovisual product is then recorded including a set of watermark characters to be available as part of the audiovisual product. For example, an alphabet of characters is provided within the audiovisual product. A navigational structure is also provided to control reproduction of the audiovisual product by controlling the output of a sequence of sections of playback content.

A second stage relates to playback of the audiovisual product. One of the previously allocated user identities is received, such as by being input by the user. One of a plurality of sequence instructions within the navigational structure is selected according to the received user identity. The recorded audiovisual product is then replayed including, in amongst the output sections of playback content, a sequence of the watermark characters. For example, the person's name is sequentially displayed letter-by-letter during presentation of the recorded video data. Hence, playback of the audiovisual product becomes adapted to the received user identity and any copy made of the playback will carry this information. The copy is then more readily traced back to the user, which provides a highly defective deterrent against copying.

One aspect of the present invention concerns the copy deterrent method discussed herein. The present invention also extends to a method of recording an audiovisual product and, separately, to a method of reproducing the audiovisual product. Further, the present invention extends to an apparatus adapted to perform any of the methods discussed herein. In particular, the invention extends to a dedicated authoring apparatus, and a dedicated recording or reproduction apparatus. In some preferred aspects, the invention also extends to a general-purpose computing device adapted or programmed to perform any of the methods discussed herein.

In a further aspect, the present invention provides an audiovisual product including a set of watermark characters. Also, the audiovisual product may have a navigational structure which includes a plurality of sequence instructions to reproduce some or all sections of playback content in a specified order, including selecting amongst the watermark characters according to a specified one of the plurality of user identities.

In a still further aspect, the present invention provides a method of creating an optical disk product. An audiovisual product as discussed herein is received, such as from an external source or by retrieving the audiovisual product from a local storage. The audiovisual product is then recorded onto an optical disk recording medium to form the optical disk product. This aspect of the method is suitably performed on a commercial scale, such as in a replication or distribution plant, to make multiple identical copies of a master version of the audiovisual product for distribution to each of a plurality of users.

For a better understanding of the invention, and to show how embodiments of the same may be carried into effect, reference will now be made, by way of example, to the accompanying diagrammatic drawings in which.

In general terms, an audiovisual product such as a movie or other presentation is formed by gathering together many small sections or clips of raw audio and visual content. This is usually termed an authoring process, wherein the raw sound clips and video clips are progressively assembled and edited together to form the finished audiovisual product. The audiovisual product is then recorded on some form of recording media. Traditionally, this would be an analogue medium such as celluloid film or analogue video tape (e.g. VHS format video tape). More recently, it has become possible to record audiovisual content onto random access media including in particular optical disc media such as DVDs, or other forms of random storage such as magnetic hard drives. These random access media have many advantages in terms of size, data capacity, playback speed, image quality and so on. However, a disadvantage has also been identified in that it is relatively easy to copy a stored audiovisual product.

An optical disc is a convenient storage media for many different purposes. A digital versatile disc (DVD) has been developed with a capacity of up to 4.7 Gb on a single-sided single-layer disc, and up to 17 Gb on a double-sided double-layer disc. There are presently several different formats for recording data onto an optical disc, including application data formats such as DVD-Video and DVD-Audio, amongst others. Of these, DVD-Video is particularly intended for use with pre-recorded video content, such as a motion picture. As a result of the large storage capacity and ease of use, DVD discs are becoming popular and commercially important. Conveniently, a DVD-Video disc is played using a dedicated playback device with relatively simple user controls, and DVD players for playing DVD-Video discs are becoming relatively widespread. More detailed background information concerning the DVD-Video specification is available from DVD Forum at www.dvdforum.org, and elsewhere.

The DVD-Video specification contains a number of built-in copy-protection features that aim to protect the audiovisual data content of the disc. These include Content Scrambling System (CSS), used to encrypt blocks of audio-video data to prevent such data being played separately from the DVD-Video presentation; and Macrovision Copy Protection, used to prevent video being copied using recording devices. Both of these systems are interpreted by the DVD-Video player that performs the appropriate function during playback. Unfortunately, these approaches do not prevent copying of the audiovisual product at the point of playback, and especially when the playback is provided by an authorised user.

The preferred embodiment of the present invention will be described with reference to the particular example of a DVD-Video format optical disc containing audiovisual content. However, it will be appreciated that the invention is applicable to a wide variety of other environments, particularly where audiovisual content is stored in some form of random access storage media. Also, it is envisaged that the DVD-Video format will itself be superseded over time and replaced with new format definitions. At the moment, Blu-Ray™ and HD-DVD formats are being developed. That is, the present invention is applicable even in these future environments.

Figure 1:
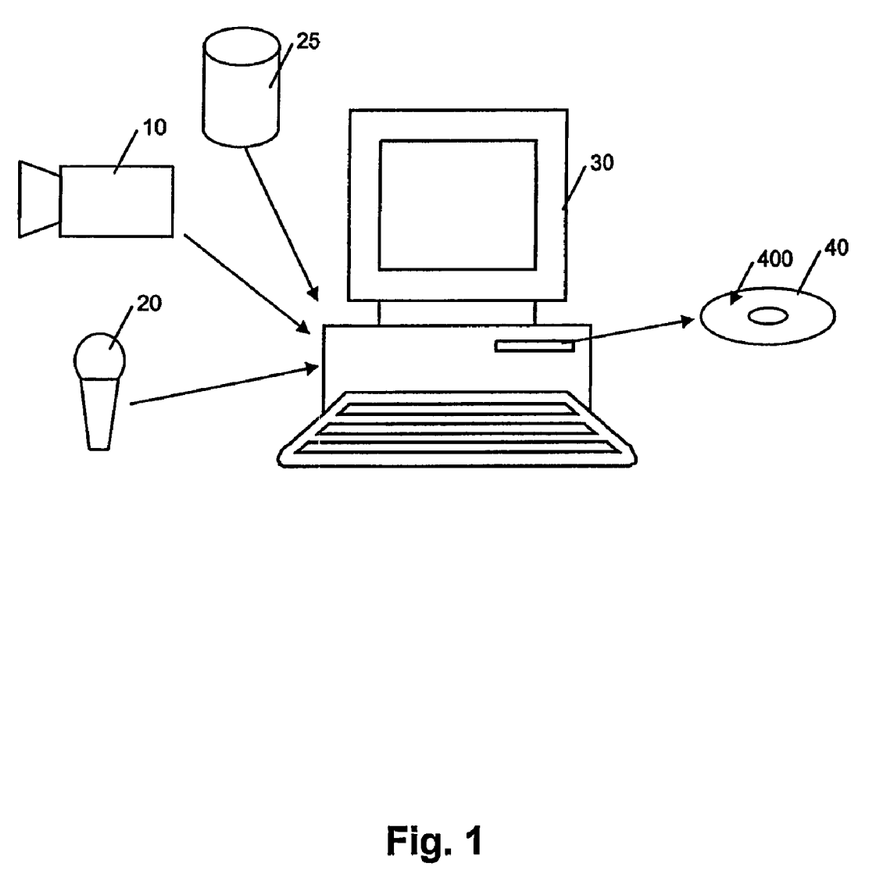
FIG. 1 is a schematic overview of an authoring apparatus.

FIG. 1 shows an example authoring apparatus as employed in preferred embodiments of the present invention. In this embodiment, the authoring apparatus includes a general purpose computing platform such as a client-server computer system, or a stand-alone personal computer 30. Alternatively, the method is implemented, wholly or at least in part, by dedicated authoring hardware.

Conveniently, an authoring method of the present invention is implemented as a program, or a suite of programs, running on the computing platform 30. The program or programs are recorded on any suitable recording medium, including a removable storage such as a magnetic disk, hard disk or solid state memory card, or as a signal modulated onto a carrier for transmission on any suitable data network, such as the Internet.

In FIG. 1, the computing platform 30 receives raw audio and video data such as through a camera 10 and a microphone 20. Alternatively, the raw audio and video assets are provided from other sources such as a file storage device 25, or are created within the authoring apparatus 30 such as by image and sound creation software. The raw content data may include video clips, audio clips, still picture images, icons, button images and other content to be presented visually or aurally upon playback of the audiovisual product. The raw content is suitably in the form of MPEG or JPEG encoded files, but may take any suitable format.

The audiovisual product 400 can take any form such as a movie, or a company presentation, or a quiz game, amongst many other possibilities. The personal computer 30 acting as the authoring apparatus creates the desired audiovisual product as will be discussed in more detail below. The authoring apparatus 30 writes the audiovisual product 400 onto a storage medium such as a hard disc drive within the personal computer 30 or onto an optical disc 40.

Figure 2:
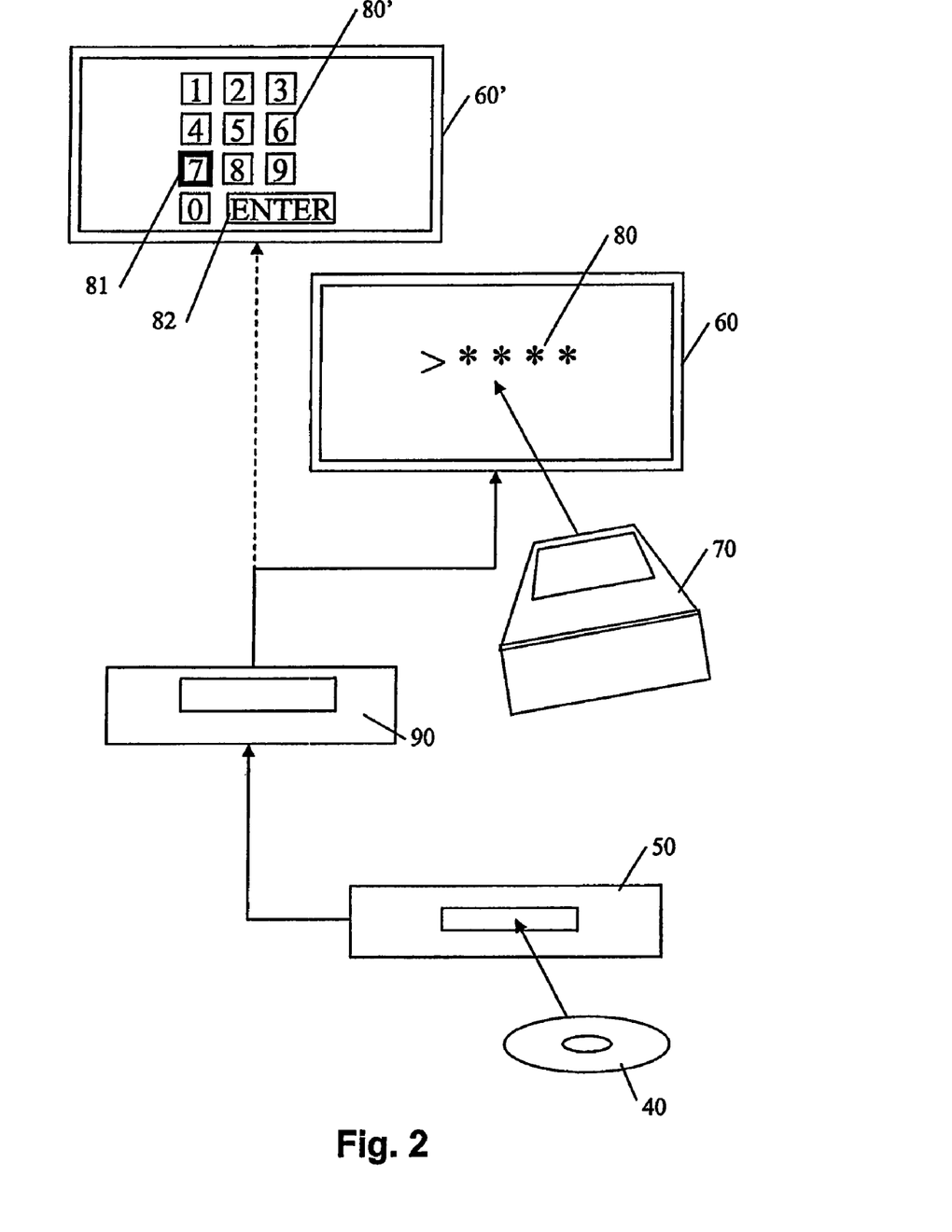
FIG. 2 is a schematic overview of a playback apparatus.

FIG. 2 is a general overview of an apparatus for reproducing the audiovisual product 400, as employed in preferred embodiments of the present invention. The audiovisual product 400 on the optical disc 40 is received into a playback apparatus, in this case including a DVD player 50 and television screen 60 (or, alternatively, television screen 60'). User controls are provided such as through a remote control handset 70. As will be explained in more detail below, in one example embodiment, the audiovisual product 400 is controlled according to user input of an access code or PIN-code 80. As shown in FIG. 2, the access code 80 is presented on the television screen 60 in response to user inputs through the remote control apparatus 70. In another example embodiment, user input in the form of an access code or PIN-code is entered by using a representation 80' of a keypad on a television screen 60'. Such a screen representation 80' may be generated using DVD menu functionality, or the like, whereby the user uses arrow keys on a standard remote control apparatus to move between and highlight numbers 81 on the keypad 80' and presses "OK" (or an equivalent "affirmative" key) on the remote control apparatus 70 to select each number in turn. Any numerical sequence or (if an alphanumeric keyboard is represented instead) alphanumeric sequence may be entered in this manner. The user then presses a representation of an "ENTER" button 82 on the screen after all numbers or characters have been entered in order to complete the operation.

Figure 3:
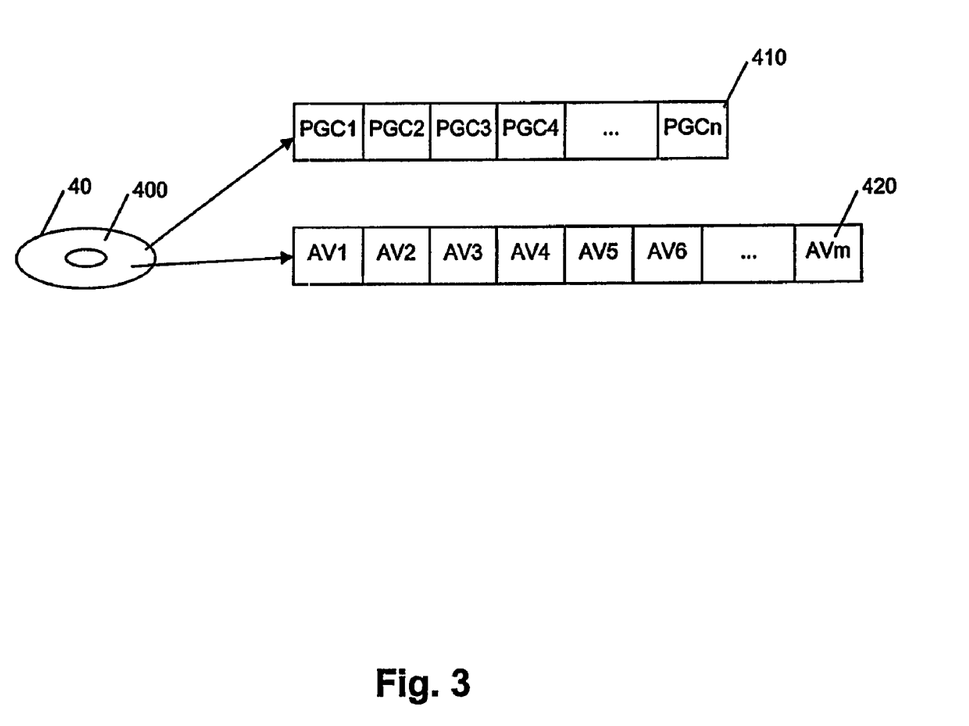
FIG. 3 is a schematic overview of an audiovisual product.

FIG. 3 shows a structure of the audiovisual product 400 in more detail. The audiovisual product 400 includes a plurality of cells 420, in this case represented by cells AV1, AV2 . . . AVm. Each cell 420 contains a short section of audiovisual data. The cells are played in sequence, typically one after the other, in order to deliver the intended audiovisual presentation, under control of a playback sequence instruction 410. The sequence instructions 410 as shown in FIG. 3 are separate from the cells 420. Suitably, the cells 420 and the sequence instructions 410 are each allocated to structure locations within the audiovisual product, so as to enable navigation between instructions 410 and from instructions 410 to cells 420.

In the preferred example of DVD-Video format data, the cells 420 are played in sequence through their inclusion by reference in programs (PGs) which are in turn organised into Program Chains (PGCs). In FIG. 3, the sequence instructions 410 are represented by Program Chains PGC1, PGC2 . . . PGCn.

The DVD-Video specification provides a structure known as a Video Object (VOB) to hold streams of audiovisual data. Each VOB includes at least one video stream, zero or more audio streams, and zero or more sub-picture streams. The VOBs are internally divided into the cells 420. An audiovisual program is presented by playing a series of the VOBs in a pre-defined sequence, using Programs and Program Chains (PGCs) 410. In the current DVD-Video specification, VOBs contain from one to nine video streams (often referred to as "multi-angle" streams), from zero to eight multi-channel audio streams, and from zero to 32 sub-picture streams.

Despite various copy protection measures, there is a fundamental point of weakness where the audiovisual product is reproduced on the display screen 60. In particular, it is relatively easy to intercept the display signal such as with a video cassette recorder (VCR) or personal digital recorder (PDR) 90 as illustrated in FIG. 2. By copying the display at the point of playback, an unauthorised copy of the audiovisual product can be made.

With this problem in mind, the present invention provides a strong and effective deterrent against copying of the audiovisual product.

Overview

Figure 4:
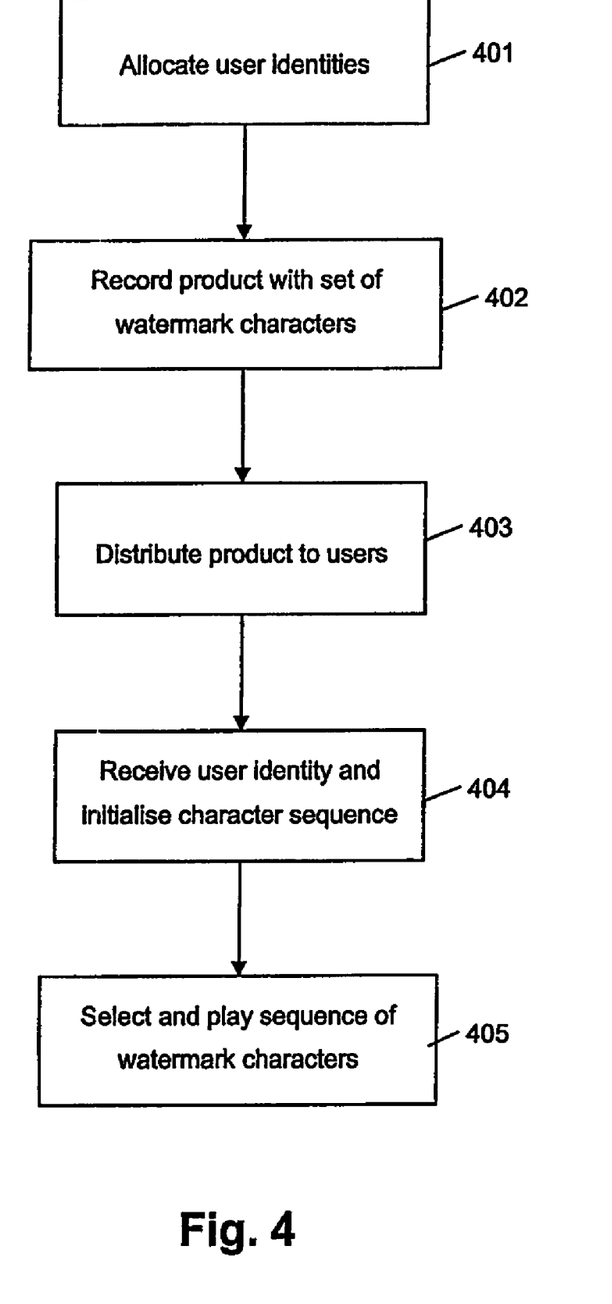
FIG. 4 is a schematic overview of a preferred method to deter copying of an audiovisual product.

FIG. 4 is a schematic overview of a preferred method to provide a watermark to deter copying of an audiovisual product.

In FIG. 4, the method includes allocating user identities to each of a plurality of users at step 401. In an example embodiment, the audiovisual product is a preview version of a forthcoming movie (commonly known as a "screener" disc) which will be distributed such as to studio executives, journalist, critics, award judges and others. The circulation list of authorised users is relatively large, and often includes several hundred or even several thousand people.

In the preferred embodiment the user identity is unique to each authorised user or group of users. The user identity may itself take any suitable form. In an example embodiment the user identity is a code or number allocated to that user or group of users. Conveniently the user identities are held initially in a mailing database or equivalent, in order to match each allocated user identity to the relevant user or group of users. That is, the user database preferably includes at least (a) user identity codes and (b) personal data of each user.

The audiovisual product is recorded as step 402 including a set of watermark characters. Each of the watermark characters is a section of playback content. In the example of DVD-video, each of the watermark characters is a video stream, an audio stream and/or a sub-picture stream in a Video Object (VOB). As an example, the set of watermark characters are the numbers "0" to "9" and/or the letters "A" to "Z". However, any suitable set of characters can be chosen in embodiments of the present invention.

Each of these original audio or video assets is prepared and recorded during the authoring process. Some currently available authoring tools require that each asset be prepared manually. More, recently, automated authoring tools have been made commercially available such as DVD-EXTRA STUDIO™ from ZOOtech Limited of Sheffield, United Kingdom, where a character database is conveniently employed to automatically create a corresponding set of audio or video assets for the watermark characters. These assets are then recorded as sections of playback content in the audiovisual product.

Once the AV product has been recorded, it is then distributed to each of the authorised users at step 403. The same version of the audiovisual product is distributed to each of the users. That is, each of the users receives an identical copy of the audiovisual product. This avoids the need to separately create individual tapes or discs or other recording medium for each user. Creating individualised audiovisual products takes a long time, is costly and is error prone. It is not practical to inspect each copy, and it requires great care to ensure that the correct product is sent to the corresponding user. By contrast, in the preferred embodiments of the present invention a single version of the audiovisual products is distributed to each of the users, which is fast, simple and much more reliable.

This first part of the method is itself useful and provides a commercially valuable audiovisual product ready for distribution to the authorised users. There is however a separate second part of the method which is performed later as each copy of the audiovisual product is played by an authorised user.

Step 404 comprises receiving one of the allocated user identities. This step may include an authentication process or other validation of the user. For example, the user telephones a checking service (or visits a website) for authentication and provides personal information such as an invitation code in a letter or email addressed to them from a user database. In return, the user is given an individual unlocking code as their user identity. This process may take any suitable form and for the purposes of the present invention it is assumed that a valid user identity is received by the playback apparatus.

In one example embodiment the user identity is received electronically such as by a transmission of data from, say, a token carried by the user to a receiver on the playback device. However, in the preferred embodiment the user enters their user identity 80 (see FIG. 2) by a numerical keypad or equivalent (e.g. on the remote control handset 70 or by a screen representation of a keypad and using handset cursor controls). This is a relatively simple and straightforward procedure for the user and involves a minimum of complications and delay.

At step 405 a sequence of watermark characters is determined based upon the received user identity 80. In a simple example, the sequence of watermark characters directly corresponds to the received user identity. However, other embodiments of the present invention employ a predetermined transformation or calculation to determine the sequence of watermark characters from the received user identity. The sequence of characters is unique to the received user identity, and is readily traceable by an investigator who knows the transformation or calculation performed.

Suitably, the user identity is received at an initial stage during playback of the audiovisual product, e.g. after an opening trailer of a movie but before the full movie is played. The sequence of watermark characters to be output is then initialised based upon the received user identity. Conveniently, the sequence is stored within a memory or other storage of the playback device. In the preferred embodiment of DVD-Video, the sequence is suitably created from the received user identity by performing recorded program instructions of a DVD-Video Virtual Machine command set and then stored in one or more general purpose registers GPRM.

Preferably, the method includes recording at least one common section of playback content to be reproduced for all of the plurality of users. Upon playback, the common sections of playback content are reproduced, so that all users see, for example, the movie trailer or other content in the audiovisual product. However, along with this common content, a watermarked sequence of playback content is also reproduced specific to the received user identity, such that the total playback experience is unique to that specific user.

The watermarks can either be overt, or hidden, or a mixture of both. Overt watermarking includes, for example, displaying the watermark characters prominently upon the screen during playback. By contrast, discrete or hidden watermarking provides information within the audio or visual output which is not noticeable to a casual observer and does not detract from their overall viewing pleasure. In either case, the personalised watermarking allows reproduction of the audiovisual product to be associated with a particular user. Where the playback is copied, then such a copy is traceable to a particular user. This acts as a highly effective deterrent against copying, since the user responsible for the copy has a high chance of being identified and caught.

Asset Preparation

Figure 5:
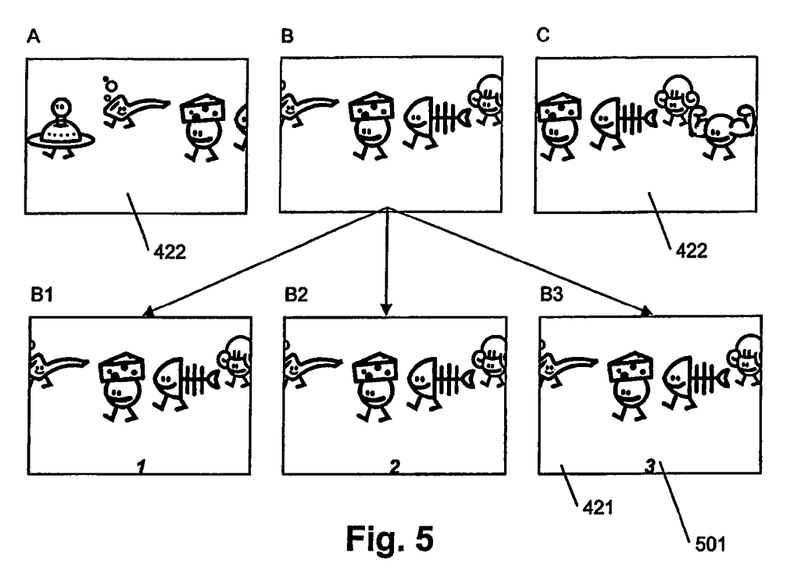
FIG. 5 shows an example of watermark characters created in the audiovisual product.

FIG. 5 shows an example video sequence divided into three sections labelled A, B & C. Conveniently, each section is recorded in a separate cell or VOB. In this example, sections A & C are retained in their original unmodified form and displayed as common content for all users. Meanwhile, section B is modified to provide a video or audio asset for each watermark character 501. In the example of FIG. 5, multiple variants of sequence B are created each having an overt marking 501 with one of the set of watermark characters, "1", "2" and so on. The product is then recorded including the common content 422 in cells A, B & C. Also, watermarked content 421 is recorded with the modified video data of cells B1, B2 & B3.

Navigational Preparation

Figure 6:
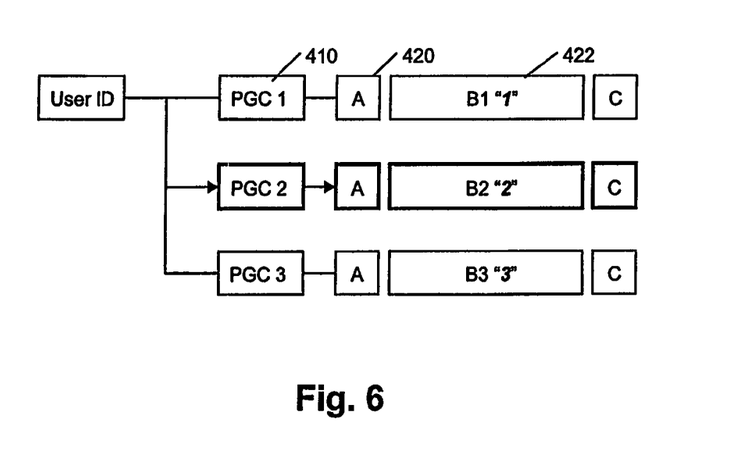
FIG. 6 shows navigational structure of the audiovisual product.

FIG. 6 shows a schematic overview of navigational structure of the audiovisual product, which includes a plurality of sequence instructions 410 to reproduce some or all of the sections of playback content 420 in a specified order. In the current DVD-video specification the playback sequences 410 are suitably each programs or PGCs.

As shown in FIG. 6, the received user identity 80 is used on playback to select one of the stored sequence instructions (PGCs) 410. The selected sequence instruction then controls reproduction of selected sections of playback content 420 to provide a playback sequence which includes the recorded watermark characters unique to the received user identity.

That is, in the example of FIG. 6 the user identity "1234" links to PGC2 and reproduces the playback content A then B2 then C. The common content is reproduced for sections A and C. However, the stored sequence instruction 410 (PGC2) also selects section B2. The section B2 is part of the unique sequence for the allocated user identity and in this instance displays the watermark character "2". The next character in the watermark sequence is then reproduced by the selected PGC in a subsequent section.

In one example the received user identity directly provides the structural location of the corresponding sequence. E.g. user identity "1234" links to PGC#1234. However, a transformation step is preferred to indirectly derive the structural location from the received user identity. E.g. ID="1234" links to 10000-"ID"=PGC#8766. Many other transformations are possible, as will be apparent to the skilled person.

Interleaving

Only a limited amount of storage space is available in any recording medium, and it is desired to keep the audiovisual product as small as possible. Hence, in the preferred embodiments of the present invention the watermarking is not displayed continuously. Instead, it is displayed only at predetermined times within a movie or upon predetermined events such as at the beginning of each chapter. That is, the watermarking is interleaved between sections of common content.

Figure 7:
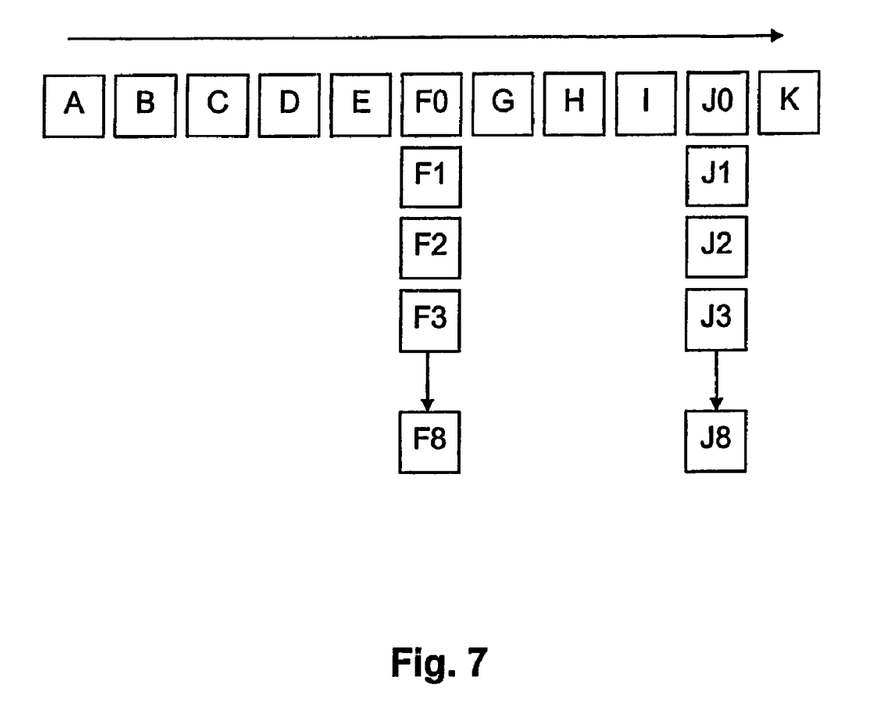
FIG. 7 illustrates navigational flow in the audiovisual product.

FIG. 7 shows a preferred example of interleaving watermark characters 421 amongst common content 422.

In FIG. 7 the playback content is divided into sections A-J which are conveniently intended for reproduction one after the other, although this is not necessarily always the case. In this example the common content of sections A-E is displayed first in sequence. Then, at section F, a choice is made whether to continue with common content (variant F0) which has no marking, or else display one of the available pre-recorded sections of watermarked content F1, F2 etc. In this example section F represents the same portion of movie but overlaid with an overt marking such as a number or letter or other character displayed prominently on screen. The presentation then continues with common content of sections G, H & I. The next watermark character is then displayed in section J.

In some circumstances it is convenient to display watermarking for some of the user identities at section F (whilst the remainder see the common content F0) and then display watermarked content for other users at section J (whilst the remainder see the unmodified common content J0).

The watermarked playback content is provided in any one or more of the video stream, the audio stream, or a sub-picture stream. The sub-picture stream is most convenient in that it is commonly used for sub-titles and similar on-screen information displays and is readily adapted to contain textual information. However, there is a weakness in that the sub-picture stream can be removed or suppressed when it is desired to make a copy of the video and audio streams. Therefore, it is preferred that the watermarked content is embedded within the video steam (i.e. recorded as part of the video data) or embedded within the audio stream (i.e. recorded as part of the audio data).

Discrete Watermarking

Figure 8:
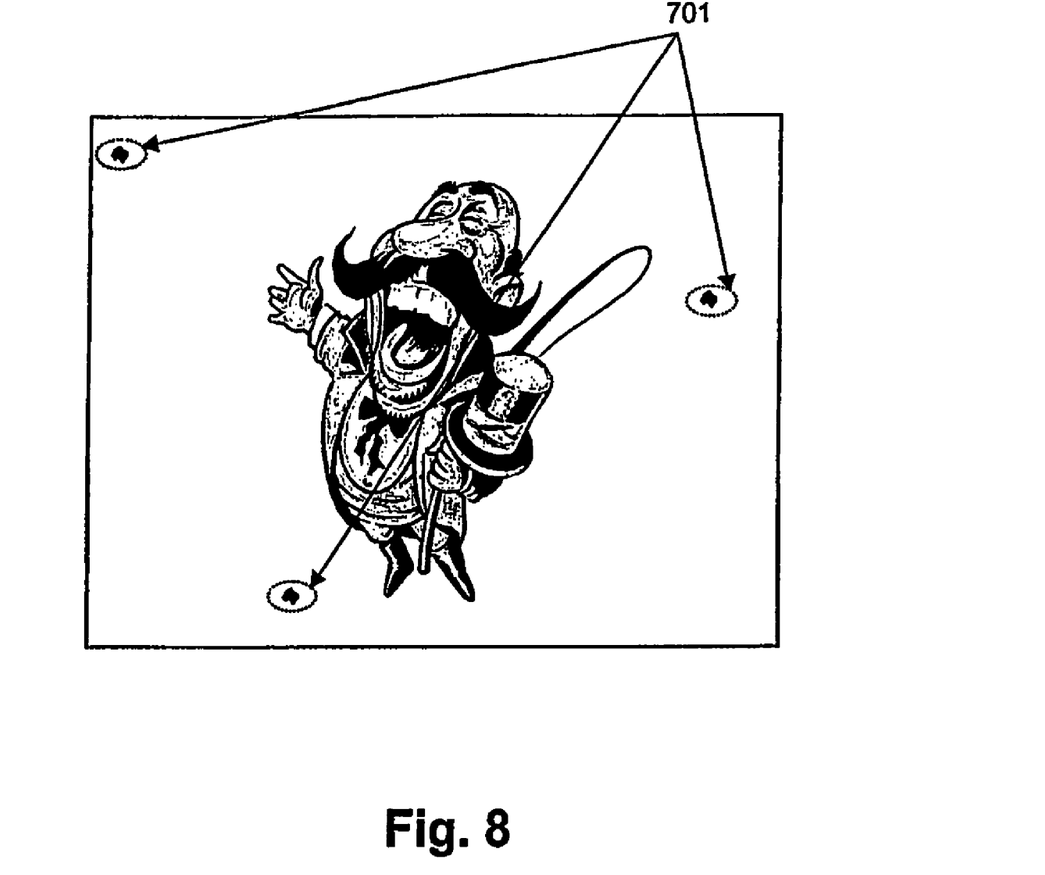
FIG. 8 is an example of a watermark character provided discretely as a digital watermark.

FIG. 8 shows examples of personalised playback content in the form of discrete watermarking. Many different techniques are available to provide an audio or visual marking which is not normally noticeable to the user, but which is detected readily by an investigator.

As shown in FIG. 8, in this case a watermark character 701 is placed in a top left corner of the display screen, such as the digits "1", "2", "3" or "4" or other character. The discrete watermark may appear at different places at different times, i.e. spatially and/or temporally distributed. The watermark characters may be made discrete by using small, irregular shapes or a colour that blends with surrounding video, so that the eye is not naturally drawn towards them. That is, the watermarking may be relatively camouflaged.

Optionally, one or more erroneous watermarks are provided within the common content, so that it is not apparent to the ordinary user which watermarks are unique to their presentation and which are common to all users of the audiovisual product. This helps to inhibit attempts to mask or otherwise suppress the watermarking when copying the audiovisual product.

One preferred form of discrete watermarking uses patterns of dots or other symbols to convey a range of possible values. These dot patterns may be provided in a consistent position and at regular intervals, or may be dispersed spatially and/or temporally as will be familiar to those skilled in the art of digital watermarking and steganography. For example, a binary numbering system is presented such as:

| Value | Character |
|-------|-----------|
| 0 | ○○○ |
| 1 | ○○● |
| 2 | ○●○ |
| 3 | ○●● |
| 4 | ●○○ |
| 5 | ●○● |
| 6 | ●●○ |
| 7 | ●●● |

The watermark characters employed in the present invention have many advantages. For example, a disc is to be sent to 10,000 recipients. It may be impractical to incorporate 10,000 individual watermarks or other identifiers to uniquely identify each of the intended recipients. In particular, the unique identifiers would require large amounts of data and consume large amounts of disc space. Also, there are difficulties in providing navigational structural locations for this number of unique sections of content. However, using watermark characters these 10,000 recipients can be identified by a value from 0 to 9999 (i.e. a four digit number) using four instances of the decimal digit 0 to 9. Referring to the example of FIG. 7, one of the digits 0 to 9 is displayed at section F, a second digit selected from the characters 0 to 9 is displayed at section J, a third digit is displayed later at section M, and a fourth digit is displayed finally say at section Y.

Over the period of a few frames, a few seconds or a few minutes, a unique sequence of watermark characters is selected and output to uniquely identify the relevant user. In this example the 10,000 possibilities have been represented using only 40 alternate video sequences (i.e. F0 to F9, J0 to J9, M0 to M9 and Y0 to Y9). Current implementations of DVD-video support only nine video angles and eight audio streams, and therefore conveniently base 9 or base 8 numbering is employed instead of base 10 as in this illustrative example.

The watermarking sequence is adaptable as required by a particular implementation by using a larger or smaller set of characters and/or a longer or shorter sequence.

Optionally, the same character sequence or a variant of the sequence is repeated at intervals throughout the audiovisual product. Hence, it is relatively difficult and time-consuming for a user to deliberately remove or obscure every instance of the watermarking.

Stream Switching

A further embodiment of the present invention will now be described which employs stream switching to select watermark characters.

As discussed above with reference to FIG. 3, Video Objects (VOBs) 420 can contain a plurality of video, audio and sub-picture streams. For example, a first VOB may contain a single video stream, while a second VOB may contain four video streams. A VOB that contains multiple video streams is often referred to as a "multi-angle block". In the current DVD-Video specification a Special Parameter 3 (SPRM3) is used to stipulate which video stream to play. This feature is designed to enable a viewer to choose between up to nine different camera angles and then to view the recorded video stream for the chosen camera angle.

Figure 9:
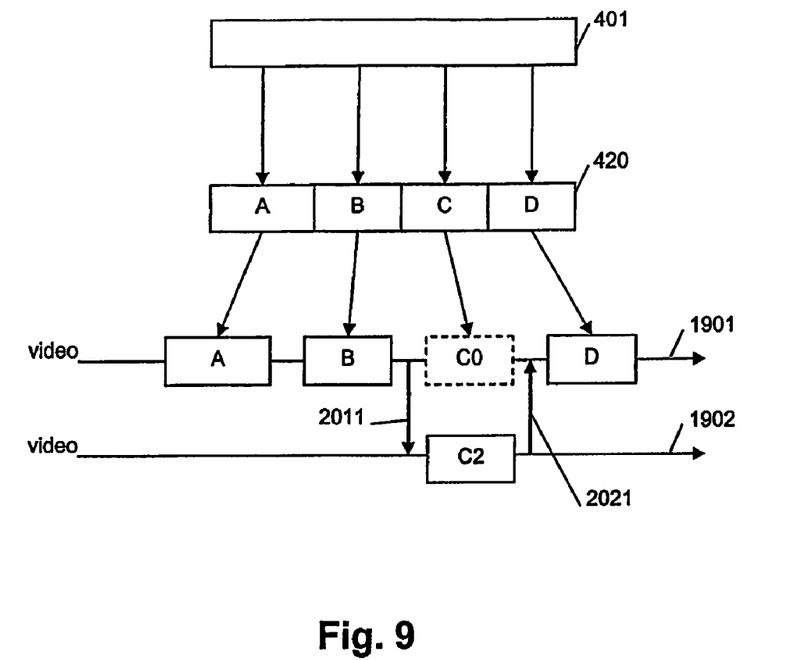
FIG. 9 is an example of navigational structure including a video stream switch.

As shown in FIG. 9, audiovisual data 401 having an intended playback sequence (e.g. a generally linear storyline) is divided into a plurality of cells 420, similar to the discussion above with reference to FIG. 7. In this example there are four sections of playback content in cells labelled A, B, C and D. The cells are divided amongst different video streams. That is, some of the cells (A B C0 D) are allocated to a first video stream 1901, whilst at least one cell (C2) is allocated to a different second video stream 1902. In order to play back the cells 402 in the desired sequence (A B C2 D), a video stream switch is required between the first stream 1901 and the second stream 1902. That is, at least one video stream switch instruction 2011,2021 is created in order to automatically switch from a first video stream 1901 to a second video stream 1902 during playback of the audiovisual product. Simply continuing with the first stream 1901 does not result in the desired playback sequence. In this example, simply continuing with the first video stream 1901 would reproduce the common content C0 instead of the watermarked character in cell C2.

Figure 10:
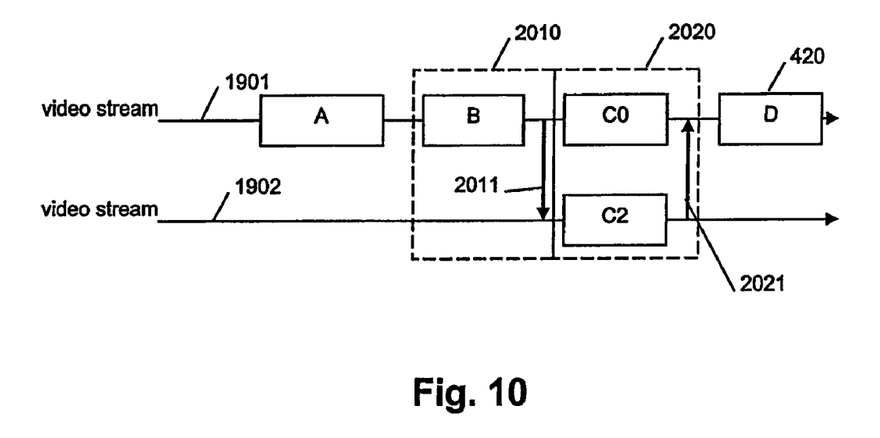
FIG. 10 is another example to illustrate video stream switching.

FIG. 10 shows the use of video streams within video objects (VOBs) in more detail. Conveniently, the cells 420 are contained within video objects (VOBS). Some of the cells (A,B,D) are held within simple VOBs 2010 having only one video stream. However, at least one video object 2020 is defined having a plurality of video streams 1901, 1902. The second video stream 1902 is provided by forming such a multi-stream video object (multi-angle block). The cell C2 is held in the second video stream 1902 within the multi-angle block 2020.

A sequence instruction 410 (i.e. a PGC) is created to reproduce the VOBs 2010, 2020 in order, thereby reproducing the cells 420 A B C D. The playback sequence is further controlled by the video stream switch instructions 2011, 2021 to switch between the video streams 1901, 1902 at appropriate points in the sequence.

In the preferred embodiment, the video stream switch instructions 2011, 2021 are performed using forced activate button commands associated with hidden menu buttons in a video object 2010 which precedes one of the multi-angle blocks 2020. In this example, the VOB for cell B includes a switch command 2011 to set the SPRM3 special parameter to "2". The value "2" is conveniently stored in a general purpose register (GPRM) upon initialisation, according to the received user identity. An example stream switch instruction is in the form:

Set Stream SP GPRM1

Upon entering the VOB for cell C as a multi-angle block, the set value of the special parameter SPRM3 determines that stream "2" is to be reproduced, in this case leading to cell C2. Also, in this example, the VOB 2020 for cell C likewise returns SPRM3 to a default value of "0" ready for a following cell.

Under current implementations of the DVD-Video specification, only a single command can be associated with a menu button. Therefore where it is necessary to perform a sequence of instructions, it is preferred to employ forced activate buttons in a number of successive cells, prior to encountering a multi-angle block. That is, a multi-line program is executed using instructions performed at the end of each of several preliminary VOBs in sequence, interleaved between each multi-angle block. Following this sequence, the Special Parameter SPRM3, which records the number of the video angle for playback, is set to the appropriate value.

Figure 11:
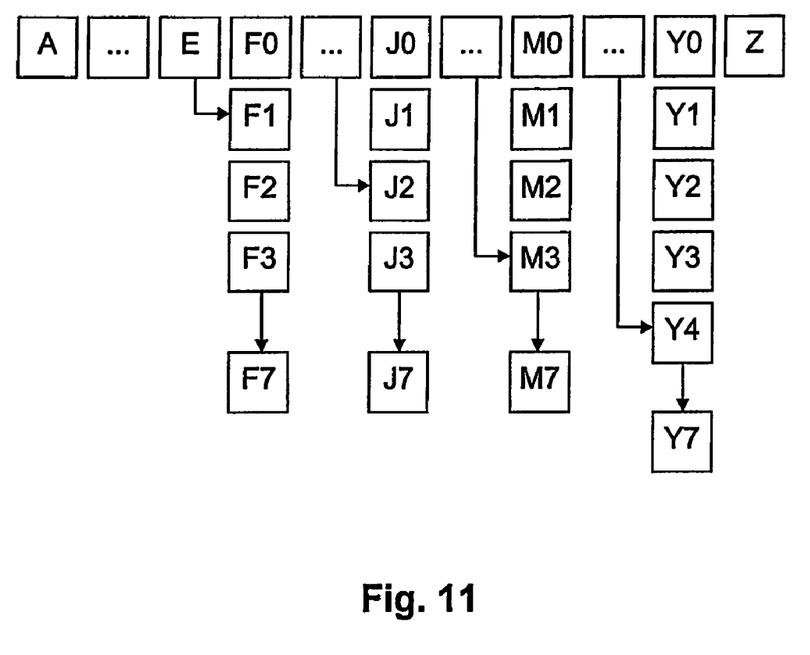
FIG. 11 is an example of a sequence of watermark characters displayed using video stream switching.

FIG. 11 shows a preferred mechanism to store and display a sequence of four separate watermark characters, where each character is embedded in a video stream of a multiple-angle block. Firstly, the desired sequence is initialised and stored. Conveniently, a general purpose registered GPRM5 is used to store four digits "1234". Secondly, each of the digits in the sequence are allocated to a specific general purpose register, such that GPRM1 stores the first digit, GPRM2 stores the second digit and so on. Example commands to accomplish this operation are shown below using commonly understood mnemonics from the DVD-Video VM command set:

|  | MOV GPRM1 GPRM5 |
| --- | --- |
| DIV GPRM1 512 | # right shift 9 bits |
| MOD GPRM1 8 | # mask low 3 bits to store first digit in GPRM1 |
|  | MOV GPRM2 GPRM5 |
| DIV GPRM2 64 | # right shift 9 bits |
| MOD GPRM2 8 | # mask low three bits—GPRM2 stores digit 2 |
|  | MOV GPRM3 GPRM5 |
| DIV GPRM3 8 | # right shift 9 bits |
| MOD GPRM3 8 | # mask low three bits—GPRM3 stores digit 3 |
|  | MOV GPRM4 GPRM5 |
| MOD GPRM4 8 | # mask low three bits—GPRM4 stores digit 4 |

As shown in FIG. 11, the value of GPRM1 is used to set the video stream before entering into section F displaying one of the watermark characters in the corresponding video stream of this multiple angle block. Similarly, the value in GPRM2 is used to set the video stream before entry into section J, GPRM3 for section M, and GPRM4 for section Y. As a result, the four characters of the watermark sequence "1234" is displayed one digit at a time during the video playback.

It is possible to overlap the occurrence of menus and sub-pictures to further compact the sequence shown in FIG. 11. That is, rather than requiring 2N sections to represent an N-digit number, the N digits may instead be displayed using N+1 sections. The first section contains the first stream switch instruction. The subsequent N sections contain both the watermark character in the video, audio or sub-picture stream as appropriate and an appropriate switch instruction to set the stream ready for a subsequent section.

In the preferred embodiment, user menu buttons are disabled during the period when the watermark characters are displayed, and it is not possible for the user to override the displayed watermark characters.

INDUSTRIAL APPLICATION

In summary, the present invention provides an effective method to deter copying of an audiovisual product, an apparatus adapted to record and reproduce such an audiovisual product, and an audiovisual product per se having copy deterrent features. In particular, the audiovisual product contains a set of watermark characters from which a sequence is selected and displayed in order to identify a particular user of an audiovisual product at the point of playback. This acts as a very effective deterrent against copying. The user stands a high change of being caught should they permit copying of the audiovisual product during playback.

The present invention has many advantages as can be seen from the above description and from carrying out embodiments of the present invention. In particular, a single version of the audiovisual product is recorded for distribution to a large number of users. The same audiovisual product is distributed to each user, giving a simpler and more reliable distribution. The audiovisual products are watermarked upon playback according to a user identity received from the user and personally identifying playback content is produced in an overt way so as to be readily visible during playback and/or in a discrete way which is unobtrusive during playback. The watermarked information is embedded within the audio and/or video playback and any copy of the audiovisual output is immediately traceable to the identified user.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A method of providing a watermark to deter copying of an audiovisual product, comprising the steps of:
providing an audiovisual product including a set of watermark characters to be available as part of the video or audio presentation of the audiovisual product, and a navigational structure of the audiovisual product which includes a plurality of sequence instructions to reproduce some or all sections of playback content in a specified order; and
replaying the audiovisual product including selecting at least one of the recorded sequence instructions according to a received user identity, and thereby outputting a sequence of the sections of playback content including a sequence of the watermark characters.

2. The method of claim 1, further comprising the steps of:
allocating a plurality of user identities to a plurality of users;
providing the audiovisual product with the set of watermark characters;
receiving one of the user identities upon playback of the audiovisual product; and
replaying the audiovisual product including selecting and displaying the sequence of the watermark characters unique to the received user identity.

3. The method of claim 2, wherein each of the user identities is unique to an authorised user or to a group of authorised users in the plurality of users.

4. The method of claim 2, wherein each user identity comprises an identity code allocated to a respective user or group of users.

5. The method of claim 1, wherein each of the watermark characters is displayable individually and the sequence of watermark characters is output by displaying a selected watermark character separately at time-spaced intervals.

6. The method of claim 1 comprising selecting and displaying a first watermark character of the set and then selecting and displaying a second watermark character of the set, to provide a predetermined sequence of the watermark characters.

7. The method of claim 1, wherein each of the watermark characters is provided as part of any one or more of a video stream, an audio stream, or a sub-picture stream in the audiovisual product.

8. The method of claim 1, wherein the watermark characters are overt so as to be readily discernable visually and/or aurally upon reproduction of the audiovisual product.

9. The method of claim 1, wherein the watermark characters are discrete and are not readily apparent visually and/or aurally during reproduction of the audiovisual product.

10. The method of claim 1, wherein the user identity is received as a numerical value, and the sequence of watermark characters is selected and output during playback derived from the received numerical value.

11. The method of claim 1, wherein the method comprises providing a user database including, for each of a plurality of user identities, a user identity code and a corresponding unique sequence of watermark characters.

12. The method of claim 11, comprising automatically creating a plurality of video or audio assets from the user database, where each asset represents a watermark character of the set.

13. The method of claim 1, wherein said selecting is done on playback.

14. The method of claim 1, comprising selecting a structural location of one of the sequence instructions directly from the received user identity or by performing a transformation of the received user identity.

15. The method of claim 1, further comprising distributing identical copies of the audiovisual product to each of a plurality of users.

16. The method of claim 1, wherein the step of receiving the user identity includes an authentication process for validation of the user.

17. The method of claim 1, wherein the user identity is received in the form of an unlock code to unlock the audiovisual product.

18. The method of claim 1, wherein the receiving step comprises receiving the user identity by the user entering a user identity code to a numerical keypad.

19. The method of claim 1, further comprising providing at least one common section of playback content to be reproduced for all users.

20. The method of claim 19, comprising providing one or more erroneous watermarks within the common content of the audiovisual product.

21. The method of claim 19, comprising reproducing the sequence of watermarks interleaved amongst sections of the common content.

22. The method of claim 1, further comprising:
providing a first watermark character in a first stream and providing a second watermark character in a second stream; and
replaying the audiovisual product including performing a stream switch instruction to select between the first and second streams and thereby select the first or second watermark character.

23. The method of claim 22, wherein the video stream switch instructions comprise one or more forced activate button commands associated with hidden menu buttons in a video object which precedes a multi-angle block.

24. The method of claim 1, further comprising:
creating and storing a predetermined switch sequence based upon a received user identity code; and replaying the audiovisual product including:
performing a first stream switch instruction based upon the predetermined switch sequence to select between at least first and second streams and thereby selectively reproduce a first instance of a recorded watermark character; and
subsequently performing a second stream switch instruction based upon the predetermined switch sequence to select between the at least first and second streams and thereby selectively reproduce a second instance of a recorded watermark character.

25. The method of claim 1, comprising recording the audiovisual product onto a portable random-access storage medium.

26. The method of claim 1, comprising recording the audiovisual product onto an optical disc.

27. The method of claim 1, wherein the method is implemented by a computer.

28. A method of creating an optical disk product, comprising the steps of:
receiving an audiovisual product having a set of watermark characters to be available as part of the video or audio presentation of the audiovisual product and a navigational structure which includes a plurality of sequence instructions to reproduce some or all sections of playback content in a specified order, at least one sequence instruction being adapted to reproduce a sequence of the sections of playback content including a sequence of the watermark characters according to a received user identity; and recording the audiovisual product onto an optical disk recording medium to form the optical disk product.

29. A computing platform programmed to perform the method of claim 28.

30. A recording medium having recorded thereon computer implementable instructions to perform the method of claim 28.

31. An authoring apparatus adapted to perform the method of claim 28.

32. A recording or reproducing apparatus adapted to perform the method of claim 28.

33. A method of providing a watermark to deter copying of an audiovisual product, said method comprising:
recording the audiovisual product, said recording comprising recording watermark characters to be available as part of the video or audio presentation of the audiovisual product, and further comprising recording a navigational structure of the audiovisual product, said navigational structure including a plurality of sequence instructions to reproduce some or all sections of playback content in a specified order;
receiving a user identity upon playback of the audiovisual product, said user identity being unique to a designated user or group of designated users; and
replaying the audiovisual product, said replaying comprising selecting, on playback, at least one of the recorded sequence instructions according to a received user identity and thereby outputting a sequence of sections of playback content including a sequence of watermark characters unique to the received user identity.

* * * * *